June 29, 1943.                A. R. WELCH                2,323,105
                    METHOD OF ASSEMBLING PLYWOOD
                  Filed Dec. 13, 1939        3 Sheets-Sheet 1
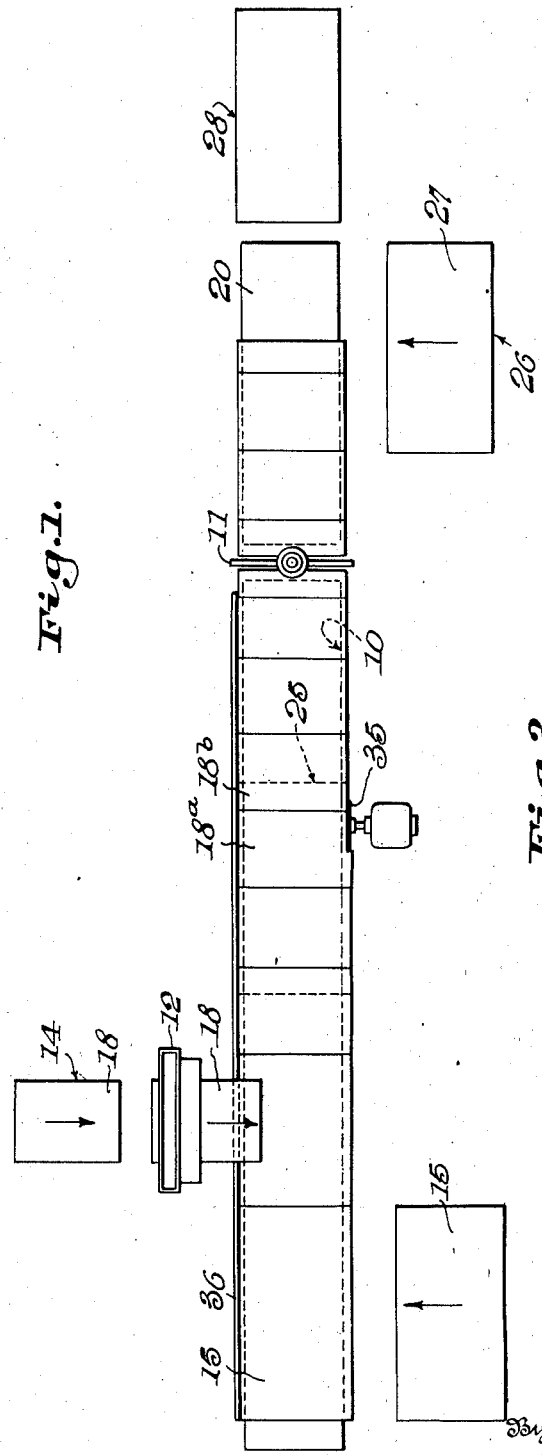
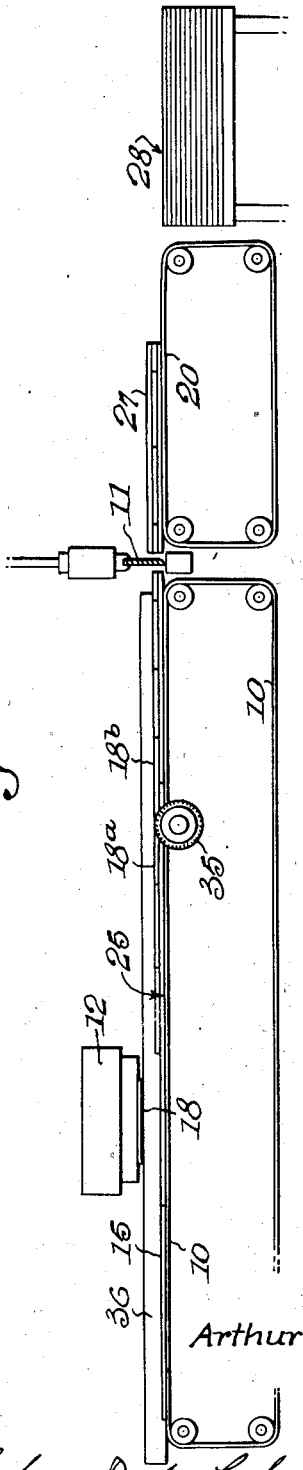
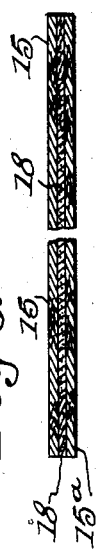
Inventor
Arthur R. Welch June 29, 1943.  A. R. WELCH  2,323,105
METHOD OF ASSEMBLING PLYWOOD
Filed Dec. 13, 1939  3 Sheets-Sheet 2
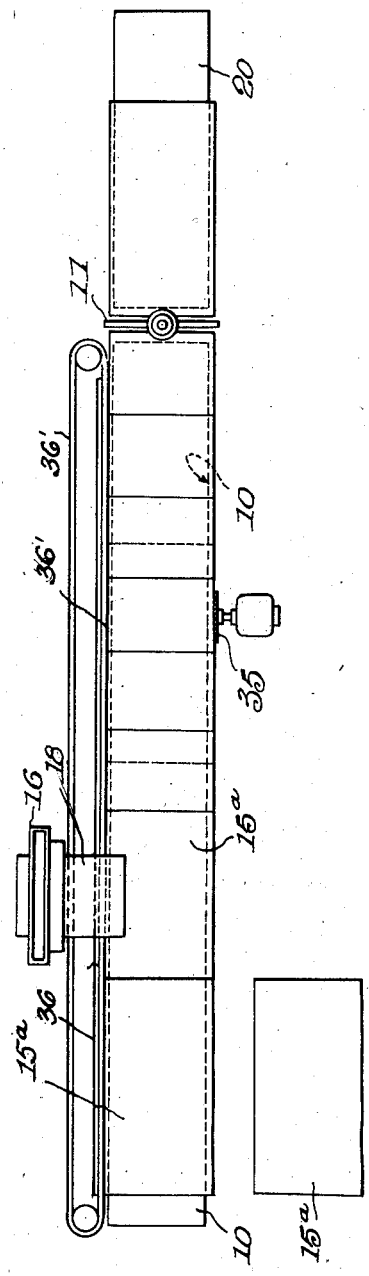
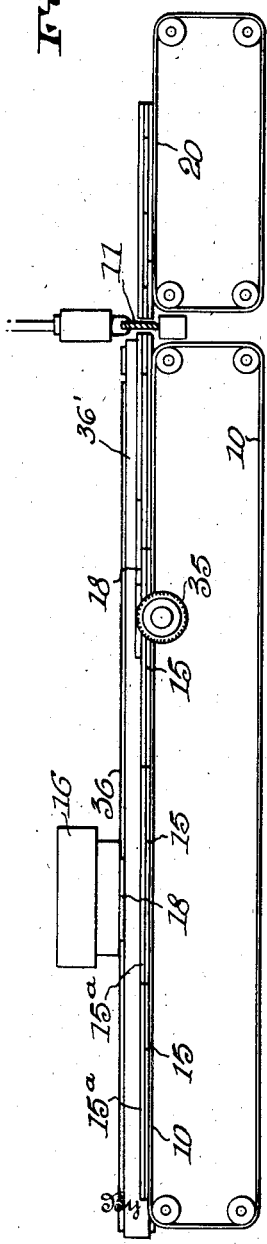
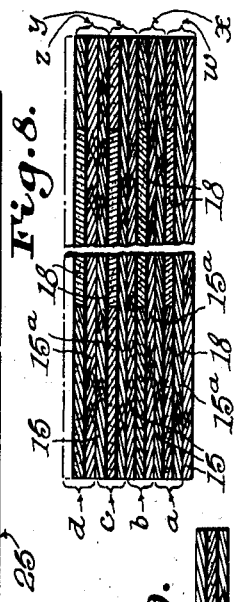
Inventor
Arthur R. Welch
Attorneys

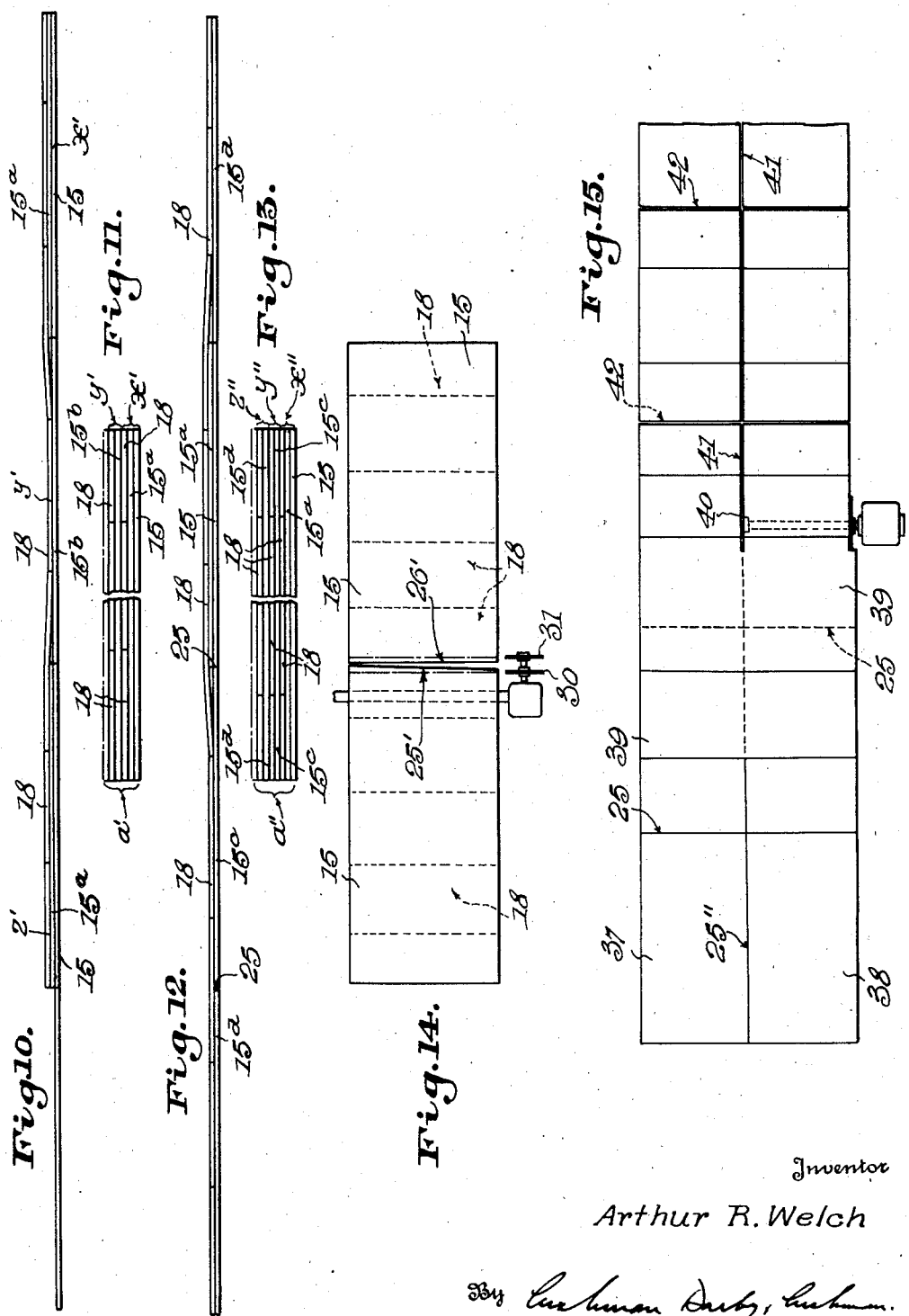

Patented June 29, 1943

2,323,105

UNITED STATES PATENT OFFICE 2,323,105

METHOD OF ASSEMBLING PLYWOOD

Arthur R. Welch, Hoquiam, Wash.

Application December 13, 1939, Serial No. 309,086

7 Claims. (Cl. 144—309)

This invention relates to the operation of assembling plywood prior to pressing and has for its main object eliminating waste of glued core stock. A further important object is to make the assembly operation more efficient and especially to facilitate assembling the plywood on a conveyor. Another object is to permit closer trimming of the component plies in general.

Hitherto, in large scale, plywood manufacture such as the production of Douglas fir plywood, conveyor assembly has been little used. The method of assembling the usual three ply panels has been to lay one of the face plies down on a stationary assembly table and then pass through an adjacent glue spreader a succession of narrow rectangular pieces suitable for the core ply and lay them down successively side by side and edge to edge transversely to cover the surface of the face ply. The core stock is mostly cut random width, the pieces being such as are obtainable from the log. To eliminate waste, many comparatively narrow pieces are handled, so that often six or eight core pieces are required for a large 48" x 96" panel.

When the core layer has nearly covered the surface of the face ply, a point is usually reached when the next available piece will overlap the remainder of the face ply. At this stage, either one of three courses is followed: A core piece may be laid which will give a wide overlap. Most of the overlap is then torn off and the torn portion, if wide enough, is used as the first core piece in assembling the next panel, allowing its irregular torn edge also to overlap. In some cases, it is found that the piece torn off will not be wide enough to be useful and, in that case, it is simply thrown away, losing both the piece of core and the glue which has been spread upon it. In other cases, the available core piece is wide enough to finish the panel and leave a straight overlapping edge which is not objectionably wide. In that case, it is not torn off and then the next panel is started with an untorn piece. While conditions in different mills vary, on the average these overlapping pieces and the pieces which are thrown away always represent a considerable waste of both core stock and glue. It is understood, of course, that as soon as the overlapping core piece is torn off, other operators lay down two more face plies, the lower one completing the first assembly and the upper one starting the next one.

The point to be noted is that, by this method, there is an overlapping useless piece of glued core stock extending out beyond each end of most of the panels that are assembled. Obviously, this practice wastes a very considerable amount of both core stock and adhesive, since, after the panels have been pressed, these overlapping ends are trimmed off and burned up. Furthermore, this overlap of glued stock overhangs the panel end and thereby causes trouble by smearing press plates if the panels are hot pressed. My invention, by eliminating this waste, of course, also does away with this smearing trouble and hence has an additional advantage when the panels are to be finished by the hot press process.

To the accomplishment of the foregoing and related ends, the invention, then, comprises the features hereinafter fully described, and particularly pointed out in the claims, the following description setting forth in detail certain illustrative embodiments of the invention, these being indicative, however, of but few of the various ways in which the principle of the invention may be employed.

I have discovered that all this waste can be eliminated, assembly on a conveyor facilitated, and various subsidiary advantages obtained by a different method. My assembly system, which is adapted for either cold pressing or hot pressing, employs a conveyor instead of a stationary table to receive the assemblies and provides facilities for performing the various assembly operations while the conveyor is carrying the stock past an adjacent glue spreader.

In the accompanying drawings, I have shown diagrammatically suitable arrangements of apparatus and certain alternative preferred method steps which may be employed in practicing the present invention.

In the drawings:

Figure 1 is a plan view of one layout.

Figure 2 is a side view, partly in elevation and partly in vertical section, similar to Figure 1.

Figure 3 is a vertical section through a plywood panel made in accordance with Figures 1 and 2.

Figure 4 is a plan view, similar to Figure 1, illustrating a modified method of assembly of the plies.

Figure 5 is a side view, partly in elevation and partly in section, corresponding to Figure 4.

Figure 6 is an enlarged, diagrammatic, longitudinal, sectional view illustrating the manner of assembling the plies on the conveyor of Figures 4 and 5.

Figure 7 is a similar view showing a ply assembly prior to stacking.

Figure 8 is a similar view showing the manner of stacking the assemblies of Figure 7.

Figure 9 is a similar view of a plywood panel made in accordance with the method of Figures 4-8.

Figure 10 is a view similar to Figure 6, but showing the manner of building up the plies on the conveyor when a five-ply board is to be formed.

Figure 11 shows the manner of stacking the ply assemblies of Figure 10 after the latter have been cut, to produce a plurality of five-ply boards.

Figure 12 is a view similar to Figure 10, showing the manner in which the plies are assembled on the conveyor when it is desired to build up seven-ply boards.

Figure 13 is a similar view showing the manner of stacking the assemblies of Figure 12 to produce seven-ply panels.

Figure 14 is a diagrammatic plan view of a modified cutter, and

Figure 15 is a similar view of a modified method of assembling and cutting the plies.

In practicing my invention, as shown in Figures 1 and 2, I provide a conveyor, usually a simple belt conveyor 10, terminating at a saw, clipper or other quick means for transversely severing a sheet of assembled stock, as indicated diagrammatically at 11. At one side of the conveyor, a short distance from its receiving end, I provide a glue spreader 12 and a supply of core stock 14, and adjacent the receiving end itself are suitably located piles of the other veneer components such as faces 15, backs 15a and intermediate plies.

In ordinary plywood manufacture, the longitudinally extending plies are rectangles, as shown at 15, 15a, longer than their width with grain parallel with the length, and these plies are as large as the finished panel with an additional allowance 16 for trim. In three-ply panels these plies are used as faces or backs and not spread with glue, while the core plies 18, instead of being a single sheet, as previously mentioned are made up of a series of edge-abutted and often comparatively narrow rectangles 18, 18a, 18b, etc., such as are obtainable from the log without undue waste. These core pieces are, of course, cut as long as the width of the face and also have grain parallel with the length. Before laying the cores in place, they are passed through the spreader 12 and coated with glue on both surfaces. In the case of a three-ply panel, the ultimate disposition of the stock is to have the glued core stock 18 transversely located between the unglued longitudinally extending face and back plies 15, 15a, as shown in Figure 3. In the case of panels having an odd number of plies greater than three, intermediate longitudinally extending plies 15b (Fig. 11) are also required. These are usually cut the full size of the panel the same as the faces and backs. In addition to the face and back plies, one intermediate ply 15b is used for a five-ply panel with two transverse layers of glued core plies, while two intermediate plies 15c, 15d (Fig. 13) with three transverse core plies are used for a seven-ply panel and so on. Thus, in the usual procedure of assmbling panels, the transverse cores 18 are the only plies which are spread with glue, while the other components are not passed through the spreader, but are left unglued and receive the adhesive only by contact with the glued core plies. The unglued members include the faces 15, backs 15a and any intermediate plies 15b, 15c, etc., which are required.

All of the unglued plies are laid longitudinally and are bound together by the transversely laid glued core stock.

Two essential cooperative features characterize my invention. In practicing it, I continuously deposit on the moving conveyor 10 (Figs. 1 and 2) a layer of transversely laid edge-abutted glue coated core plies 18 as received from the glue spreader 12, upon a previously continuously deposited lower layer of substantially end-abutted, adjacent or contiguous unglued plies 15, etc. In laying the glue coated core plies on the conveyor, I select pieces of such width as to provide individual cores which overlap across the ends 25 of the lower layer of substantially end-abutted unglued plies and then, as the combined sheet passes along the conveyor to the location of the severing means 11, usually a saw or clipper, I sever the combined sheet transversely approximately at the adjacent or contiguous ends 25 of the unglued plies before pressing the individual assemblies. The novel and essential features are the adjacent or contiguous overlapping arrangement of the core plies 18 with respect to the ends 25 of the other plies 15 and the feature of clipping-off or severing the combined sheet at these lines of substantial end abutment so as to provide individual assemblies suitable for handling through the final pressing operation.

I find that these two features of providing a glue spread overlapping core ply and then severing the combined sheet may be used with various arrangements of the ply stock, so as to permit several convenient methods of completing the assembly. This permits me to produce any of the usual plywood combinations including in particular all the customary panels having an odd number of plies. Combinations having an even number of plies may also be produced.

*Example 1.*—Referring to Figure 1, for instance, if I wish to produce three-ply assemblies, by one method I may provide on the conveyor 10 a lower sheet consisting of a single thickness of substantially end-abutted unglued outer plies 15, then assemble thereon a layer of transversely laid edge-abutted glue coated core plies 18, so laid that the adjacent or contiguous ends 25 of the lower plies are overlapped, then run the combined two-ply sheet down to the clipper 11, and, after the combined sheet is severed, superimpose, from a stack 26, an additional unglued ply 27 on each severed unit, thus forming complete three-ply assemblies which may be piled up in a stack 28 and then pressed in the usual way.

*Example 2.*—As shown in Figures 4-9, another and usually preferable method of assembling three-ply panels according to my invention, is to provide that the lower sheet of substantially end-abutted unglued plies is of double thickness consisting of registered pairs including a face ply 15 and a back ply 15a and then, after providing the transverse overlapping sheet 18 of glued core plies and severing the combined sheet at the adjacent or contiguous ends 25 of the unglued plies, these units may be piled up successively, as shown in Figure 8, to form a stack of three-ply assemblies, it being noted, however, that on the bottom of the stack there will be a superfluous face ply 15 which is required on the top of the stack to form the top face ply, to complete the top assembly. In practice, I usually start the bottom sheet for the first assembly with only a single ply using two plies thereafter and then, when the stack is completed, I lay on an extra ply to complete the top assembly.

In Figure 8, sufficient ply assemblies are shown to form four plywood panels, but it must be understood, of course, that, in practice, a far greater number of assemblies are usually employed. As indicated by the brackets, a, b, c and d, each representing a plywood panel, the panels are made up from the uppermost unglued ply 15a and the glue coated core ply 18 of one assembly and the lowermost unglued ply 15 of the next assembly thereabove. The latter ply 15, when placed upon the coated ply 18 of the assembly therebelow, adheres to the coating on the upper face of the core ply and itself becomes the face ply of the assembly therebelow. The brackets w, x, y and z, at the right of Figure 8, indicate individual assemblies, as they are piled up. It will be noted that the lowermost uncoated ply 15 of the assembly x adheres to the upper face of the uppermost, glued ply of the assembly w to produce the ply board indicated by bracket a at the left of Figure 8. Likewise, the lowermost ply 15 of assembly y adheres to the upper face of the coated core ply 18 of the assembly x, to produce the plywood panel represented by bracket b at the left of Figure 8 and so on. The lowermost uncoated ply 15 of assembly w may be placed upon the upper face of the core ply 18 of the assembly z, to finish the stack, or the lowermost assembly w may include only a single uncoated lower panel, in which case a separate panel 15 is placed upon the upper surface of the assembly z to form the ply board c.

*Example 3.*—If it is desired to form multi-ply panel assemblies having any odd number of plies, this may be accomplished by using a single thickness sheet of substantially end-abutted unglued plies, then applying thereon a sheet of core stock made up of a series of transverse glued plies overlapping the adjacent or contiguous ends of the first mentioned plies, as before, and then after clipping the sheet at the abutments, as in Figures 1 and 2, an additional outer ply may be interposed during the piling at whatever interval is necessary to form multi-ply panel assemblies having the desired odd number of plies.

*Example 4.*—It is also possible to make five-ply assemblies by a modification of the method described in Example 2. As shown in Figures 10 and 11, the modification consists in providing that the lower sheet of substantially end-abutted unglued plies 15, 15a instead of being continuously of double thickness, is laid alternately of single and then double thickness. In other words, upon alternate face plies 15, I lay a back ply 15a, while the intermediate plies 15b are left uncovered at the outset. After applying the glue spread overlapping transverse plies 18 over both the double and single thickness unglued plies and severing the sheet at the ends of the unglued plies, it will be found that if these units are piled successively, they will form a stack of five-ply assemblies, as indicated in Figure 11. Although that figure shows sufficient plies to make only a single five-ply panel, it will be understood that, when a plurality of assemblies arranged as indicated, are piled one on top of the other, a plurality of five-ply boards will be formed. The lowermost assembly x' consists of two unglued plies 15, 15a and an upper glued core ply 18. This assembly may be cut from the continuous line of panels on the conveyor, as indicated at x' in Figure 10. The next assembly y' comprises a single, intermediate uncoated ply 15b and a glue coated core ply 18 thereabove. The lower ply 15b will be adhesively united in the stack to the upper, coated core ply 18 of the assembly x'. If further assemblies are piled on the stack, as in the usual practice, in accordance with the invention, the three-ply assembly z', shown at the left in Figure 10, will be superimposed upon the assembly y', so that the lower, uncoated face ply 15 thereof will be adhesively united to the upper surface of the coated core ply 18 of assembly y', thereby forming a complete, five-ply panel a', as indicated by the bracket at the left of Figure 11. Uncoated ply 15a of assembly z' will then constitute the bottom or back ply of the next ply board which will be built up in a similar manner. The stack may be completed by taking the bottom ply 15 of the assembly x' and placing it on top of the uppermost two-ply assembly or the uppermost assembly may be completed by simply placing an extra uncoated ply thereon.

*Example 5.*—Although seven-ply panels may be made in accordance with Example 2, a preferred method is indicated diagrammatically in Figures 12 and 13. In this case, I lay on the conveyor a pair of registered unglued panels 15, 15a followed by substantially end-abutted panels 15c, 15d of single thickness, over all of which panels glued core plies 18 are laid in the manner previously described, whereupon the series is cut in the usual manner. The plies are stacked as indicated in Figure 13. The bottom assembly x'' comprises two uncoated plies 15, 15a and an upper coated ply 18. The next two assemblies y'', z'' comprise single uncoated plies 15c, 15d, respectively, and intermediate core plies 18. Upon the assembly z'', the next three ply assembly x'' will be placed, whereupon the lower unglued ply 15 thereof will adhere to the assembly z''. As a result the seven-ply board a'' will be formed.

The lowermost, unglued panel 15 of the lowermost assembly x'' may, as indicated above, be used to complete the uppermost assembly, or an independent uncoated ply may be used for this purpose as previously indicated.

As a further modification, it will be seen that by putting registered pairs of core stock pieces through the spreader, so that the individual pieces of core stock are only spread with glue on one surface, it is possible to make up two-ply assemblies or any assembly having an even number of plies.

It will be understood that it is desirable to choose a core ply which will overlap the adjacent or contiguous ends of the lower plies considerably, because this avoids the possibility of having one of the panels end with a core piece which is so narrow that it might fall out in handling. It is also evident that it is desirable to have another short conveyor 20 just beyond the saw or clipper 11 to handle the stock to the point where it is conveniently piled up, as indicated at 28 in Figures 1 and 2. It will also be understood that the piling of the assemblies before transferring them to the press may be done either manually or by any convenient piling apparatus. It will also be noted that in order to produce perfectly square assemblies, it is desirable that the saw or clipper 11 be located so as to make its cut at an exact 90° angle to the line of conveyor travel.

In some instances, the substantially abutting, contiguous ends 25', 26' of the face plies may not be entirely square with the side edges, and, in that case, the cutting means may be arranged so as to make two closely spaced parallel cuts, as shown in Figure 14, through both the core sheet and the underlying face plies and these cuts can readily be arranged, so that when the material between the cuts is removed, the rear end edge of one assembly is square with its side edge and parallel with the front end of the following assembly. For this arrangement a pair of traveling saws 30, 31 is preferably to a clipper.

It will be seen that by this method I eliminate any waste of glued core stock and also do away with the troublesome overlapping core feature of the former method, as well as the inconvenience and delay of tearing off the glued core. Furthermore, I find that less allowance is required for trim at the ends of the panels, so that the saving is extended to other plies than the core. I also find that in conjunction with my system a saw, such as is shown digrammatically at 35, may conveniently be installed along one or even both sides of the conveyor to square up one or both side edges of the assemblies as they move ahead which permits a further economy in allowance for side trim. Usually, a saw is required only on one side of the sheet, since, by laying the other edge against a butting board 36 that edge is kept true and all the plies on that edge are readily registered to a straight line by originally placing them tight against the butting board. This feature may be provided in the form of an endless belt 36' (Figs. 4 and 5) resting on edge and arranged to travel at synchronous speed with the conveyor, thus eliminating friction and possible displacement of the plies as they move along the butting board.

This method opens up economies in another direction. A large proportion of fir plywood production consists of panels having a length which is twice the width, the finished size of 48" x 96" being common. In making up this size the face stock is cut 96" long along the grain plus an allowance for trim, and the transverse core stock which runs across the width of the panel, is cut to half this length. I find that by providing a conveyor of two panel width, to take panels side by side, as indicated at 37, 38 in Figure 15, and, instead of cutting the core stock to the usual 4 foot length, by leaving it in the original 8 foot length, as indicated at 39, it is possible for the core layer to, in effect, lay down two core pieces 37, 38 at once which increases the output and does away with the labor and waste of originally cutting the core stock to 4 foot lengths. In such cases, the face stock may consist either of pieces 8 feet square or of two 4 x 8 pieces, as shown at 37, 38 in Figure 15, laid side by side with their side edge in substantial abutment at 25", but, in either case, the core stock 39 is put through the spreader in the 8 foot length and laid across the face stock. I then install an additional saw 40 a short distance down the conveyor which automatically cuts between the face stock on line 25" and through the middle of the core stock on line 41, as the assembly passes by and severs the wide sheet to form two continuous sheets of three ply assembly suitable, for instance, for panels four feet wide and eight feet long. I then clip both assemblies at 42 to length in the usual way. Obviously, the same scheme may be used for sizes which have other dimensions than a length of twice the width.

A very important feature of my method is the elimination of the smearing trouble. If the panels are to be hot pressed, it is very desirable to avoid having any overhanging portions carrying glue which might become smeared onto the press plates. With the old method of assembly, this trouble has been serious. Any smearing of glue on the press plates during loading tends to stick the panels to the press and cause difficulty in unloading, besides gradually causing foreign substances to build up on the press plates which will mar and indent subsequent panels.

Another important advantage is that the two ends of my assemblies are straight mutually parallel lines with the margins of all the plies trimmed in exact register with each other. This is a new condition in unconsolidated plywood assemblies which greatly facilitates loading and, of course, reduces trim and waste after the panel is consolidated by the pressing. The same feature applies also to the lateral edges of assemblies produced by my method where a butting board provides one true edge and saw is used to true up the opposite edge while the assemblies pass along the conveyor. This also tends to facilitate handling of assemblies in loading into a press and makes a saving of stock removed when squaring up the finished panels for sale. It is important, of course, to arrange the saw or clipper that cuts the ends to make its cut exactly at a 90° angle to the sides of the assembly. With that condition maintained, there is little need for any further trim to produce accurate rectangular plywood.

Where, in the claims, reference is made to registered pairs of plies, I mean a pair of superposed plies with their edges in substantial registration. Also, the terms "contiguous" and "adjacent" are used synonymously, as fully defined in standard dictionaries, such as Webster's New International, second edition.

It will thus be seen that my new method of assembly effects a series of savings both in labor and material which reach an aggregate economy that is substantial. Furthermore, it is an important advance from the standpoint of facilitating the application of the assembly-line method of mass production to the plywood industry.

Other modes of applying the principle of the invention may be employed, change being made as regards the details described, provided the features stated in any of the following claims, or the equivalent of such, be employed.

I claim:

1. A process of assembling rectangular component plies required to make plywood panels, including glue coated core plies and uncoated face plies, which comprises continuously depositing in a moving line a succession of uncoated plies with the grain substantially parallel to the direction of movement of the line and with the ends of successive plies contiguous to each other, continuously depositing on said line of uncoated plies a succession of edge-abutted core plies of single thickness having both faces glue coated, having the grain transverse to the direction of movement of the line, and being substantially equal in length along the grain to the width of the uncoated plies and arranged to overlap the contiguous ends thereof by a substantial amount, severing units from the lines of plies so formed by cutting the same on lines between the contiguous ends of the uncoated plies, and superposing upon the glue coated core plies an additional uncoated ply with the grain parallel to the grain in the first-mentioned uncoated plies and with its edges substantially registered with the corresponding edges of the first-mentioned ply.

2. A process of assembling rectangular component plies required to make plywood panels, including glue coated core plies and uncoated face plies, which comprises continuously depositing in a moving line a succession of uncoated plies of single thickness only and with the grain substantially parallel to the direction of movement of the line and with their end edges contiguous to each other, continuously depositing on said line of uncoated plies a succession of edge-abutted core plies of single thickness having both faces glue coated, having the grain transverse to the direction of movement of the line, and being substantially equal in length along the grain to the width of the uncoated, contiguous plies and arranged to overlap the lines of the ends thereof by a substantial amount, severing units from the lines of plies so formed by cutting the same on lines between the ends of the uncoated plies, and superposing upon the glue coated core plies of the severed units a single additional uncoated ply with the grain parallel to the grain in the first-mentioned uncoated plies and with its edges substantially registered with the corresponding edges of the first-mentioned ply, thereby producing three-ply plywood panels.

3. A process of assembling rectangular component plies required to make plywood panels, including glue coated core plies and uncoated face plies, which comprises continuously depositing in a moving line a succession of uncoated plies superposed in registered pairs and with the ends of successive pairs in substantially abutting relation and with the grain substantially parallel to the direction of movement of the line, continuously depositing on the upper surface of said line of uncoated plies a succession of edge-abutted core plies of single thickness having both faces glue coated, having the grain transverse to the direction of movement of the line, and being substantially equal in length along the grain to the width of the uncoated, end-abutted plies and arranged to overlap the lines of end-abutments thereof by a substantial amount, severing units from the lines of plies so formed by cutting the same on the lines of end-abutment of the uncoated plies, and superposing a plurality of the severed units, whereby the lower uncoated ply of the superposed pairs of plies in each unit, except in the lowermost unit, is positioned directly upon and adhered to the glue coated core ply of the unit therebelow to form three-ply plywood panels.

4. A process of assembling rectangular component plies required to make plywood panels, including glue coated core plies and uncoated face plies, which comprises continuously depositing in a moving line a series of uncoated plies arranged longitudinally with the grain substantially parallel to the direction of movement of the line and in substantially end-abutted relation, the plies in the series being arranged in a repeating cycle of a pair of superposed registered plies alternating with a single ply, continuously depositing on the upper surface of said line of uncoated plies a succession of edge-abutted core plies of single thickness having both faces glue coated, having the grain transverse to the direction of movement of the line, and being substantially equal in length along the grain to the width of the uncoated, end-abutted plies and arranged to overlap the lines of end-abutments thereof by a substantial amount, severing a series of units from the lines of plies so formed by cutting the same on the lines of end-abutment of the uncoated plies, thereby alternately producing individual three-ply and two-ply units, each having an upper glue coated ply, and superposing the series of units thus produced with the three-ply and two-ply assemblies alternating, whereby five-ply plywood panels are produced, each comprising the upper two plies of a first three-ply assembly, both plies of the next two ply assemblies and the lowermost uncoated face ply of a second three-ply assembly.

5. A process of assembling rectangular component plies required to make plywood panels, including glue coated core plies and uncoated face plies, which comprises continuously depositing in a moving line a succession of substantially end-abutted uncoated plies of substantially twice the width of the desired finished plywood panels and with the grain substantially parallel to the direction of movement of the line, continuously depositing on said line of uncoated plies, a succession of edge-abutted core plies of single thickness having both faces glue coated, having the grain transverse to the direction of movement of the line and being substantially equal in length along the grain to the width of the line of uncoated, end-abutted plies and arranged to overlap the lines of end-abutment thereof by a substantial amount, then severing the lines of uncoated and glue coated plies longitudinally of the moving line substantially midway between the side edges thereof, then severing from the two lines so produced, pairs of adjacent units by cutting the lines on the lines of end-abutment of the uncoated plies, and superposing upon the glue coated core plies of each of the severed units an additional uncoated ply with the grain parallel to the grain in the first-mentioned ply and with its edges substantially registered with the corresponding edges of the first-mentioned ply.

6. In the manufacture of plywood, the process which comprises depositing in a moving line, a succession of substantially rectangular uncoated plies with the grain substantially parallel to the direction of movement of the line and with the ends of successive plies contiguous to each other, continuously depositing on said line of uncoated plies a succession of edge-abutted glue coated plies of single thickness with the grain transverse to the direction of movement of the line and substantially equal in length, along the grain, to the width of the uncoated plies and arranged to overlap the adjacent, substantially abutting ends thereof by a substantial amount, severing units from the lines of plies so formed by cutting the same on lines between the contiguous ends of the uncoated plies, and pressing the severed units to unite the glue coated plies to the uncoated face plies, to produce plywood panels.

7. In the manufacture of plywood, the method which comprises the following steps in suitable order; positioning a plurality of face members in line and in contiguous end to end relation; providing adhesive material for both faces of cross banding stock; placing said cross banding stock on said face members with the cross banding stock in edge abutting relation and extending continuously over both the face members and the ends of the face members; cutting the portions of the cross banding stock that extends across the ends of each two face members; and placing other face members on said cross banding stock in substantial registration respectively with said first named face members.

ARTHUR R. WELCH.